US012588975B2

(12) United States Patent
Aldayel et al.

(10) Patent No.: US 12,588,975 B2
(45) Date of Patent: Mar. 31, 2026

(54) ORTHODONTIC PLIERS WITH FORCE SCALE

(71) Applicant: KING SAUD UNIVERSITY, Riyadh (SA)

(72) Inventors: Abdullah Mohammad Aldayel, Riyadh (SA); Ahmed Ali Alfawzan, Alrass (SA); Eman Abdulbaset Alnamnakani, Riyadh (SA); Faycal Ben Yahia, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/647,558

(22) Filed: Apr. 26, 2024

(65) Prior Publication Data

US 2025/0331957 A1 Oct. 30, 2025

(51) Int. Cl.
A61C 7/04 (2006.01)

(52) U.S. Cl.
CPC ...................................... A61C 7/04 (2013.01)

(58) Field of Classification Search
CPC ....... A61C 7/02–04; A61C 7/06; A61C 19/04; A61C 3/16; A61B 90/06; A61B 2090/064; B25B 7/00–22
See application file for complete search history.

(56) References Cited

U.S. PATENT DOCUMENTS

| | | | | |
|---|---|---|---|---|
| 3,696,662 | A | | 10/1972 | Foltz et al. |
| 4,001,940 | A | * | 1/1977 | Cusato ..................... A61C 7/04 |
| | | | | 29/229 |
| 4,189,839 | A | * | 2/1980 | Manuel ................... A61C 7/04 |
| | | | | D8/57 |
| 4,217,686 | A | * | 8/1980 | Dragan .................. A61C 7/303 |
| | | | | 433/4 |

(Continued)

FOREIGN PATENT DOCUMENTS

| | | | |
|---|---|---|---|
| CN | 201108508 Y | | 9/2008 |
| CN | 211325744 U | * | 8/2020 |
| CN | 213883563 U | * | 8/2021 |

OTHER PUBLICATIONS

Translation of CN18647558 (Year: 2021).*
Translation of CN211325744 (Year: 2020).*

Primary Examiner — Edelmira Bosques
Assistant Examiner — Shannel Nicole Belk
(74) Attorney, Agent, or Firm — Nath, Goldberg & Meyer; Joshua B. Goldberg

(57) ABSTRACT

The orthodontic pliers with a force scale is an orthodontic tool with an integrated force scale for measuring the force of an elastic band or a power train during attachment thereof to a fixed orthodontic appliance. The orthodontic pliers include first and second members each having a gripping portion and a jaw portion. The first and second members are pivotally attached to one another in a manner similar to conventional pliers. A force scale is secured to the first member. The force (Continued)

scale includes a hook adapted for releasable attachment to an elastic band, power train or the like such that the force scale can measure the tension force thereof. The hook is positioned adjacent the respective jaw portions of the first and second members. As in a conventional pair of Mathieu pliers, the respective gripping portions of the first and second members may be selectively lockable to one another.

2 Claims, 1 Drawing Sheet

(56) References Cited

U.S. PATENT DOCUMENTS

| | | | | |
|---|---|---|---|---|
| 4,975,051 | A * | 12/1990 | Kargas | A61C 7/02 |
| | | | | 433/3 |
| 5,212,871 | A * | 5/1993 | Luccarelli | A61C 7/303 |
| | | | | 33/514 |
| 5,791,350 | A * | 8/1998 | Morton | A61B 90/06 |
| | | | | 600/587 |
| 6,000,941 | A * | 12/1999 | Ingels | A61C 7/04 |
| | | | | 433/4 |
| 7,793,571 | B2 | 9/2010 | Streuli | |
| 10,588,716 | B1 * | 3/2020 | Alhuwaish | A61C 7/04 |
| 2017/0071180 | A1 * | 3/2017 | Gierke | A01K 97/00 |

* cited by examiner

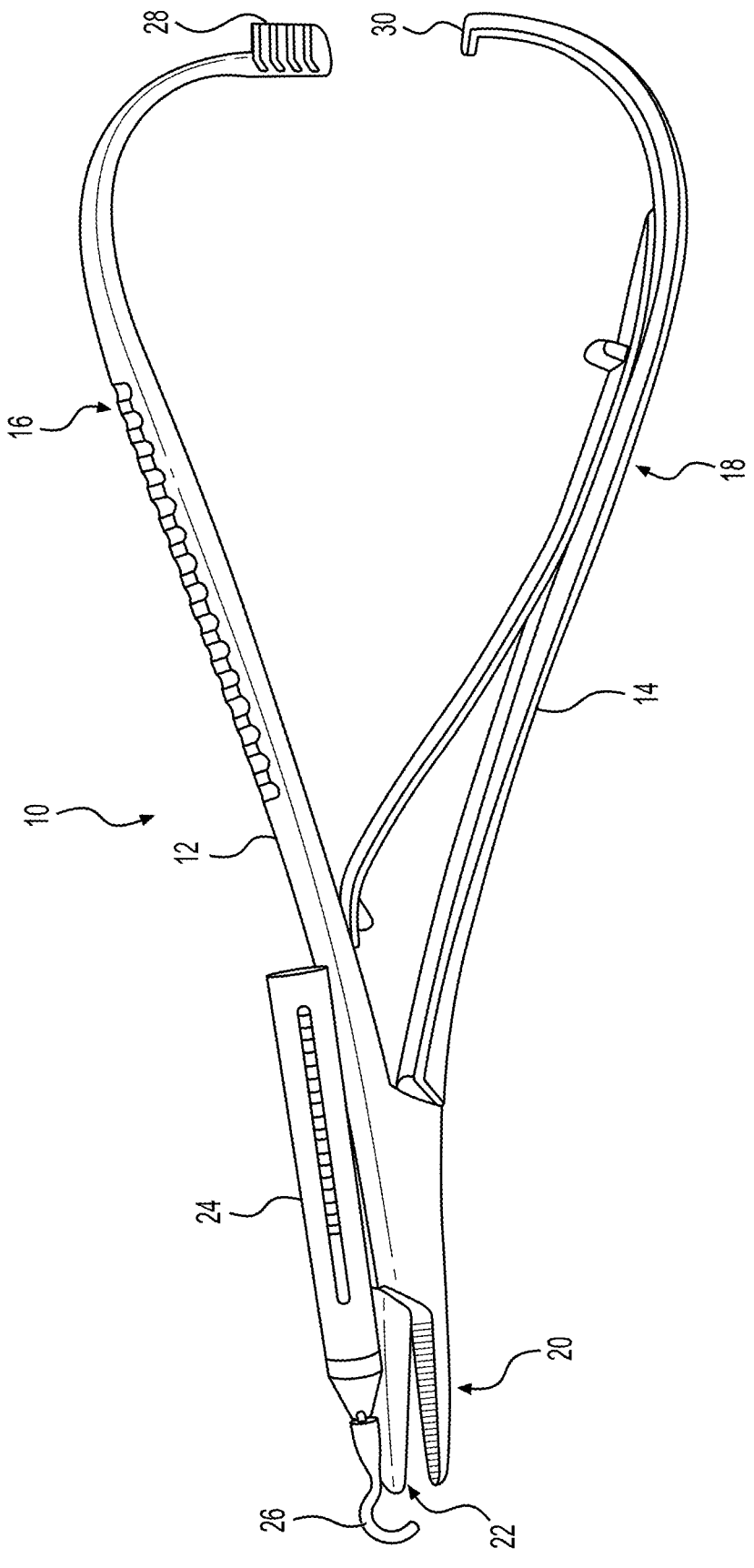

ORTHODONTIC PLIERS WITH FORCE SCALE

BACKGROUND

Field

The disclosure of the present patent application relates to orthodontics, and particularly to orthodontic pliers with an integrated force scale.

Description of Related Art

The majority of orthodontic treatments use appliances which are fixed in place, such as braces that are bonded to the teeth. Another common example is the fixed expander, which includes hooks for growth modification. Fixed appliances have the advantage of better mechanical control over the teeth and the treatment outcome. Orthodontic tooth movement is based on the amount of force exerted by elastic bands or power chains that are attached to fixed orthodontic appliances. Force above the recommended range may lead to pain and discomfort for the patient and, in some cases, may cause excessive root or bone resorption due to the formation of a hyalinized zone. If the force is less than the average, this will typically lead to an increase in the overall treatment time and could potentially lead to additional complications. Thus, being able to properly gauge the force applied by an elastic band, power train or the like is critical to orthodontic treatment. Although force scales may be used by the orthodontist during treatment, such scales are employed on their own (i.e., not integrated into other equipment), thus requiring the orthodontist to switch back and forth between using the force scale and other instruments, such as orthodontic pliers. Thus, orthodontic pliers with a force scale solving the aforementioned problems is desired.

SUMMARY

The orthodontic pliers with a force scale is an orthodontic tool with an integrated force scale for measuring the force of an elastic band or a power train during attachment thereof to a fixed orthodontic appliance. The orthodontic pliers include first and second members each having a gripping portion and a jaw portion. The first and second members are pivotally attached to one another in a manner similar to conventional pliers. As a non-limiting example, the orthodontic pliers with a force scale may be configured as a modified pair of Mathieu pliers. A force scale is secured to the first member. The force scale includes a hook adapted for releasable attachment to an elastic band, power train or the like such that the force scale can measure the tension force thereof. The hook is positioned adjacent the respective jaw portions of the first and second members. As in a conventional pair of Mathieu pliers, the respective gripping portions of the first and second members may be selectively lockable to one another.

These and other features of the present subject matter will become readily apparent upon further review of the following specification.

BRIEF DESCRIPTION OF DRAWINGS

The sole drawing FIGURE is a plan view of orthodontic pliers with a force scale.

DETAILED DESCRIPTION

The orthodontic pliers with a force scale 10 is an orthodontic tool with an integrated force scale 24 for measuring the force of an elastic band, power train or the like during attachment thereof to a fixed orthodontic appliance. The orthodontic pliers 10 include first and second members 12, 14, respectively, each having a gripping portion 16, 18, respectively, and a jaw portion 20, 22, respectively. The first and second members 12, 14 are pivotally attached to one another in a manner similar to conventional pliers. It should be understood that the overall configuration, shape, relative dimensions and pivotal attachment of first and second members 12, 14 are shown in the sole drawing FIGURE for exemplary purposes only and may be varied. In the non-limiting example of the sole drawing FIGURE, the orthodontic pliers with a force scale 10 is shown configured as a modified pair of Mathieu pliers.

A force scale 24 is secured to the first member 12. The force scale 24 includes a hook 26 adapted for releasable attachment to an elastic band, power train or the like such that the force scale 24 can measure the tension force thereof. The hook 26 is positioned adjacent the respective jaw portions 20, 22 of the first and second members 12, 14. As in a conventional pair of Mathieu pliers, the respective gripping portions 16, 18 of the first and second members 12, 14 may be selectively lockable to one another using locking ends 28, 30. It should be understood that locking ends 28, 30 are shown for exemplary purposes only and that any suitable type of releasable and adjustable locking mechanism may be used. Additionally, it should be understood that although the sole drawing FIGURE depicts a conventional spring scale, the force scale 24 may be any suitable type of force measuring scale or sensor, such as a digital force scale, a digital or spring force gauge or the like.

It is to be understood that the orthodontic pliers with a force scale is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. Orthodontic pliers with a force scale, comprising:
   first and second members each having a gripping portion and a jaw portion, the first and second members being pivotally attached to one another;
   the force scale secured to the first member and having a hook,
   wherein the hook is positioned on the jaw portion of the first or second members, wherein the respective gripping portions of the first and second members are selectively lockable to one another using only a first locking end of the first gripping portion being selectively lockable with only a second locking end of the second gripping portion, and wherein the hook is adapted for releasable attachment to an elastic band or a power train.

2. The orthodontic pliers with a force scale as recited in claim 1, wherein the force scale is a spring scale.

* * * * *